June 4, 1929.  K. J. WERSÄLL  1,715,806
CENTRIFUGAL FRICTION CLUTCH
Filed June 2, 1925
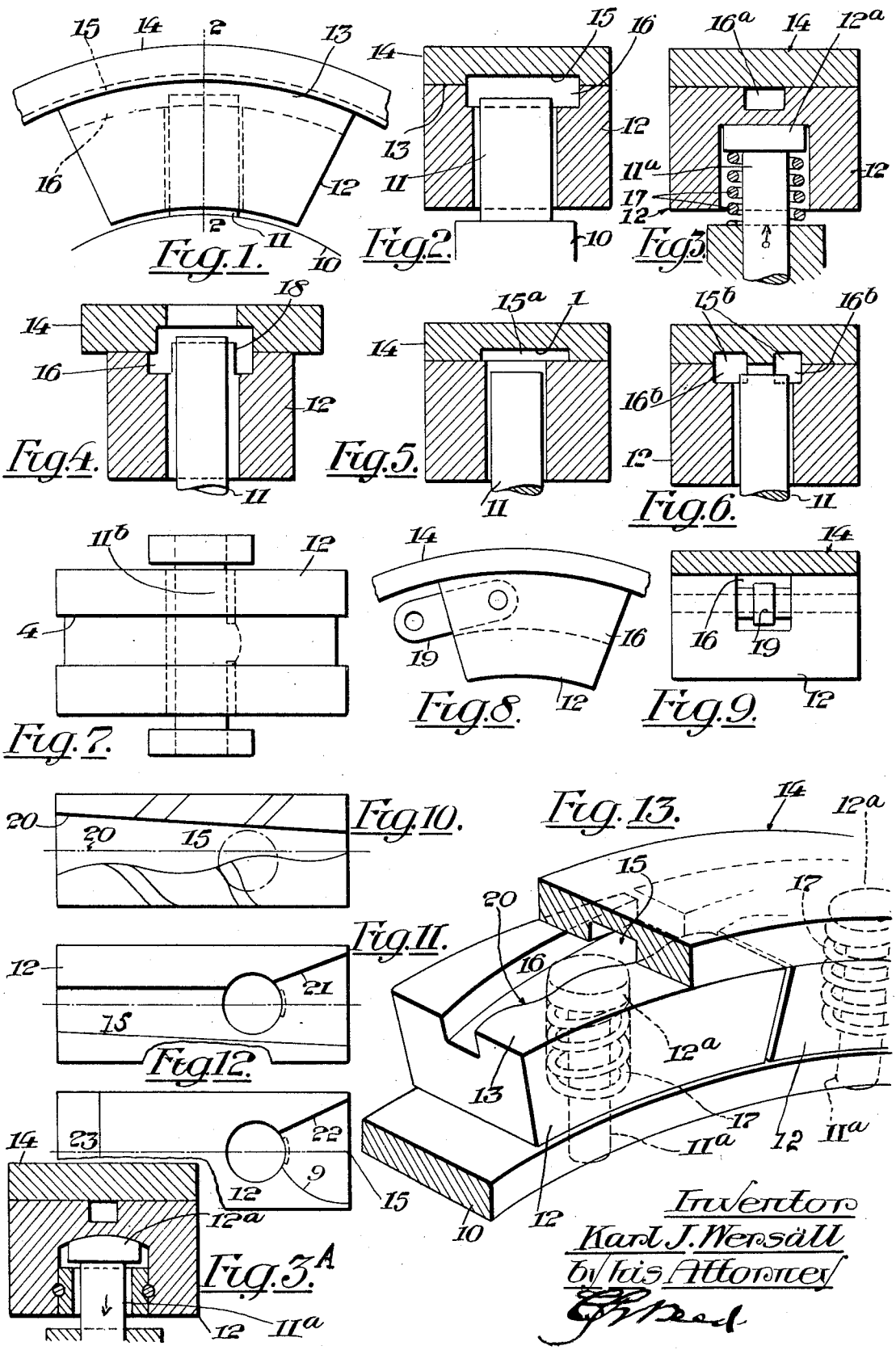

Patented June 4, 1929.

1,715,806

UNITED STATES PATENT OFFICE.

KARL JOHAN WERSÄLL, OF STOCKHOLM, SWEDEN, ASSIGNOR TO AMERICAN KAMBI COMPANY, OF NEW YORK, N. Y., A CORPORATION OF DELAWARE.

CENTRIFUGAL FRICTION CLUTCH.

Application filed June 2, 1925, Serial No. 34,273, and in Sweden June 5, 1924.

My invention relates to friction clutches of the spring or centrifugal type and has for its object certain novel arrangements and combinations of parts hereinafter described and claimed, and illustratively exemplified in the accompanying drawings.

The invention has for its purpose the provision of friction bodies formed in such way as to ensure the proper engagement between the body and the track without damage thereto when slipping of the clutch occurs, thus maintaining a practically constant co-efficient of friction in the aggregate.

Heretofore friction clutches had the weakness that they did not wear well during their slipping action, for as soon as an obstacle appeared the track (such as dust from wear or the like) the pressure was considerably increased at the point of obstruction, so that the particle was presed into the surfaces and the smoothness of the same damaged. There was also a considerable wear of the contact surfaces. This has heretofore made it impossible to design a reliable friction clutch with a constant factor of friction. These disadvantages are, however, overcome by placing one or more grooves in the track or the friction body, or in both. These grooves permit the passage through the grooves of any particles in line with the pin and thus prevent the blow of these particles on the shoe being transmitted to the pin. If the particle strikes the shoe at either side of the groove, there is a certain oscillatory movement of the shoe which tends to throw the particle to one side or the other of the friction surface of the shoe, thus relieving the shoe thereof.

Figure 1 is a fragmental view of a clutch device having a radially disposed driver pin; Figure 2 is a transverse sectional view taken on line 2—2 of Figure 1; Figure 3 is a transverse sectional view of the clutch members showing a groove arranged in the friction body; Figure 3ª illustrates a form of clutch device in which the pin is connected with the shoe by a block keyed to the shoe; Figure 4 is a transverse sectional view of the clutch showing an extension of the driver projecting into the groove in the track; Figure 5 illustrates a modification having a groove in the track only; Figure 6 illustrates a double groove arrangement in both adjacent surfaces; Figure 7 illustrates a modification of the invention having an axially arranged driver pin; Figure 8 illustrates the centrifugal body provided with a link driver in axial projection; Figure 9 is a side elevational view of the same; Figures 10 to 12 inclusive are views of modified forms of recesses or grooves; Figure 13 is a composite perspective, partly sectional, view illustrating the irregular-shaped grooves of Figure 10 in the shoe, a groove in the track and the spring-arranged pin of Figure 3—this view also showing a pair of juxtaposed shoes.

Referring to the drawings, and particularly Figures 1 and 2, 10 denotes the driving element which comprises preferably a rotary disc member having radially arranged pins 11 projecting from its periphery. Loosely guided on each pin 11 and having an extended straight contact surface therewith is a shoe or engaging member 12 which is preferably segmental in shape and is provided with a curved inner surface to conform to the adjacent periphery of the driver disc 10 and a concentric outer engaging or contacting surface 13 adapted to be brought into contact with the inner periphery of a stationary or driven ring member 14. In practice the bore of the shoe has a diameter greater than that of the pin thereby to permit the shoe to have a slight oscillatory movement during its radial movement relative to the pin to engage the friction surface of the cooperating member. In this embodiment of the invention, the contacting surfaces of the ring 14 and shoe 12 are provided with longitudinal grooves 15 and 16, respectively. Since, according to this invention, two or more shoes or engaging elements are distributed circumferentially about the driven member 14, there will result during operation, a perfect balancing of the points of frictional engagement between the members. The breaking up of the engaging surfaces by means of the grooves 15 and 16 affords ample protection against slippage in that any foreign substances which may adhere to the surfaces will not affect the full width of the same.

In Figure 3, the shoe 12 is urged radially by a spring 17 disposed against the driving member at one end and against the head 12ª of the pin 11ª. In this modification the pin is the radially movable member which forces the shoe into contact with the driven ring 14. In Figure 3ª the pin 11ª is cooperatively connected with the shoe by a block keyed to the shoe; and the tapered face on the outer end of the radial pin is for the purpose of insuring a better contact surface to take up the thrust of the pin against the shoe and to insure a more secure guiding of the parts; Figure 3 also illustrates the use of only one groove 16ª and that is cut in the shoe. Figure 5 shows one groove 15ª also but the latter in this modification is in the contacting surface of the driven ring 14. The engaging surfaces in Figure 6 are provided with two sets of parallel grooves 15ᵇ and 16ᵇ.

Figure 4, differentiates from the other modifications in that the shoe 12 is provided with an extension 18 which projects into the path left by the groove in the ring 14.

Figure 7, illustrates a shoe 12 carried by a pin 11ᵇ disposed axially in the clutch, while in Figures 8 and 9 the shoe 12 is centrifugally operated by a link connection 19 with the driver element.

The grooves thus far described and illustrated may be assumed to have straight perpendicular sides and arranged to follow a true peripheral line about the respective member, but in Figures 10 to 12, both inclusive, the grooves are both irregular in width and contour. The side 20 of the groove in Figure 10 is undulated, while in Figure 11 the sides 21 are angular and in Figure 12 the sides 22 are shown V-shaped, the friction surface being partially removed as indicated at 23.

Having now described the nature of my invention what I claim and desire to secure by Letters Patent is:—

1. The combination of a rotary driving member, a cooperating member having a friction surface concentric with the driving member, and segmentally shaped shoes carried by the driving member for oscillatory movement and shiftable radially to engage the friction surface of the cooperating member, one of said engaging friction surfaces having in the direction of movement of the driving member a lengthwise extending groove formed in its friction surface thereby dividing said friction surface into a plurality of relatively wide bands for the purpose set forth.

2. The combination of a rotary driving member, a cooperating member having a friction surface concentric with the driving member, a plurality of radially disposed pins carried by the driving member, and segmentally shaped shoes loosely mounted on said pins for oscillatory movement and shiftable radially to engage the friction surface of the cooperating member, one of said engaging friction surfaces having in the direction of movement of the driving member a lengthwise extending groove thereby dividing said friction surfaces into a plurality of relatively wide bands for the purpose set forth.

3. The combination of a rotary driving member, a cooperating member having a friction surface concentric with the driving member, and segmentally shaped shoes carried by the driving member for oscillatory movement and shiftable radially to engage the friction surface of the cooperating member, one of said engaging friction surfaces having in the direction of movement of the driving member a lengthwise extending groove extending throughout the length of said friction surfaces thereby dividing said friction surfaces into a plurality of relatively wide bands for the purpose set forth.

4. The combination of a rotary driving member, a cooperating member having a friction surface concentric with the driving member, and segmentally shaped shoes carried by the driving member for oscillatory movement and shiftable radially to engage the friction surface of the cooperating member, each having in the direction of movement of the driving member a lengthwise extending groove terminating at the end of the shoe thereby dividing said shoe into a plurality of relatively wide friction bands for the purpose set forth.

5. The combination of a rotary driving member, a cooperating member having a friction surface concentric with the driving member, and segmentally shaped shoes carried by the driving member for oscillatory movement and shiftable radially to engage the friction surface of the cooperating member, each having in the direction of movement of the driving member a lengthwise extending groove terminating at the front end of the shoe thereby dividing said shoe into a plurality of relatively wide friction bands for the purpose set forth.

6. The combination of a rotary driving member, a cooperating member having a friction surface concentric with the driving member, and segmentally shaped shoes carried by the driving member for oscillatory movement and shiftable radially to engage the friction surface of the cooperating member, each having in the direction of movement of the driving member a lengthwise extending groove extending from end to end of the shoe thereby dividing said shoe into a plurality of relatively wide friction bands for the purpose set forth.

7. The combination of a rotary driving member, a cooperating member having a friction surface concentric with the driving member, a plurality of radially disposed pins carried by the driving member, and segmentally shaped shoes loosely carried by said pins for oscillatory movement and shiftable radially to engage the friction surface of the cooperating member, and each having in the direction of movement of the driving member a lengthwise extending groove terminating at the end of the shoe thereby dividing said shoe into a plurality of relatively wide friction bands for the purpose set forth.

8. The combination of a rotary driving member, a cooperating member having a friction surface concentric with the driving member, a plurality of radially disposed pins carried by the driving member, and segmentally shaped shoes loosely carried by said pins for oscillatory movement and shiftable radially to engage the friction surface of the cooperating member, and each having in the direction of movement of the driving member a lengthwise extending groove terminating at the front end of the shoe thereby dividing said shoe into a plurality of relatively wide friction bands for the purpose set forth.

9. The combination of a rotary driving member, a cooperating member having a friction surface concentric with the driving member, a plurality of radially disposed pins carried by the driving member, and segmentally shaped shoes loosely carried by said pins for oscillatory movement and shiftable radially to engage the friction surface of the cooperating member, and each having in the direction of movement of the driving member a lengthwise extending groove extending from end to end of the shoe thereby dividing said shoe into a plurality of relatively wide friction bands for the purpose set forth.

10. The combination of a rotary driving member, a cooperating member having a friction surface concentric with the driving member, a plurality of radially disposed pins carried by the driving member, segmentally shaped shoes loosely mounted on said pins for oscillatory movement and shiftable radially to engage the friction surface of the cooperating member, each of said shoes having in the direction of movement of the driving member a lengthwise extending groove terminating at the end of the shoe thereby dividing said shoes into a plurality of relatively wide friction bands for the purpose set forth, and resilient means carried by each pin for forcing the shoe in one direction.

11. The combination of a rotary driving member, a cooperating member having a friction surface concentric with the driving member, and segmentally shaped shoes carried by the driving member for oscillatory movement and shiftable radially to engage the friction surface of the cooperating member, each having in the direction of movement of the driving member a lengthwise extending groove terminating at the end of the shoe thereby dividing said shoes into a plurality of relatively wide friction bands for the purpose set forth, one of the opposing side walls of the groove having an irregular form.

12. The combination of a rotary driving member, a cooperating member having a friction surface concentric with the driving member, and segmentally shaped shoes carried by the driving member for oscillatory movement and shiftable radially to engage the friction surface of the cooperating member, each having in the direction of movement of the driving member a lengthwise extending groove terminating at the end of the shoe thereby dividing said shoes into a plurality of relatively wide friction bands for the purpose set forth, the opposing side walls of the groove being spaced at different distances throughout its length.

13. The combination of a rotary driving member, a cooperating member having a friction surface concentric with the driving member, a plurality of radially disposed pins carried by the driving member, and segmentally shaped shoes each having a centrally disposed bore therethrough for the reception of a pin, said bore and pin having extended straight contact surfaces and said bore having a diameter greater than that of the pin thereby to permit the shoe to have a slight oscillatory movement during its radial movement relatively to the pin to engage the friction surface of the cooperating member, each of said shoes having in the direction of movement of the driving member a lengthwise extending groove opening at an end of the shoe and at said bore thereby dividing the friction surface of said shoe into a plurality of relatively wide friction bands for the purpose set forth.

14. The combination of a rotary driving member, a cooperating member having a friction surface concentric with the driving member, a plurality of radially disposed pins carried by the driving member, and segmentally shaped shoes each having a centrally disposed bore therethrough for the reception of a pin, said bore and pin having extended straight contact surfaces and said bore having a diameter greater than that of the pin thereby to permit the shoe to have a slight oscillatory movement during its radial movement relatively to the pin to engage the friction surface of the cooperating member, each of said shoes having in the direction of movement of the driving member a lengthwise extending groove terminating at each end of the shoe and intersected by said bore thereby dividing the friction surface of the shoe into a plurality of relatively wide friction bands for the purpose set forth.

15. The combination of a rotary driving member, a cooperating member having a friction surface concentric with the driving member, a plurality of radially disposed pins carried by the driving member, and segmentally shaped shoes each having a centrally disposed bore for the reception of a pin and shiftable radially to engage the friction surface of the cooperating member said cooperating member and each shoe having opposed lengthwise extending grooves thereby dividing said cooperating member and shoes into a plurality of relatively wide friction bands for the purpose set forth.

In testimony whereof I have affixed my signature.

KARL JOHAN WERSÄLL.